July 2, 1929.  J. W. McADAM  1,719,273
DRAWING BOARD
Filed Feb. 9, 1924  2 Sheets-Sheet 1
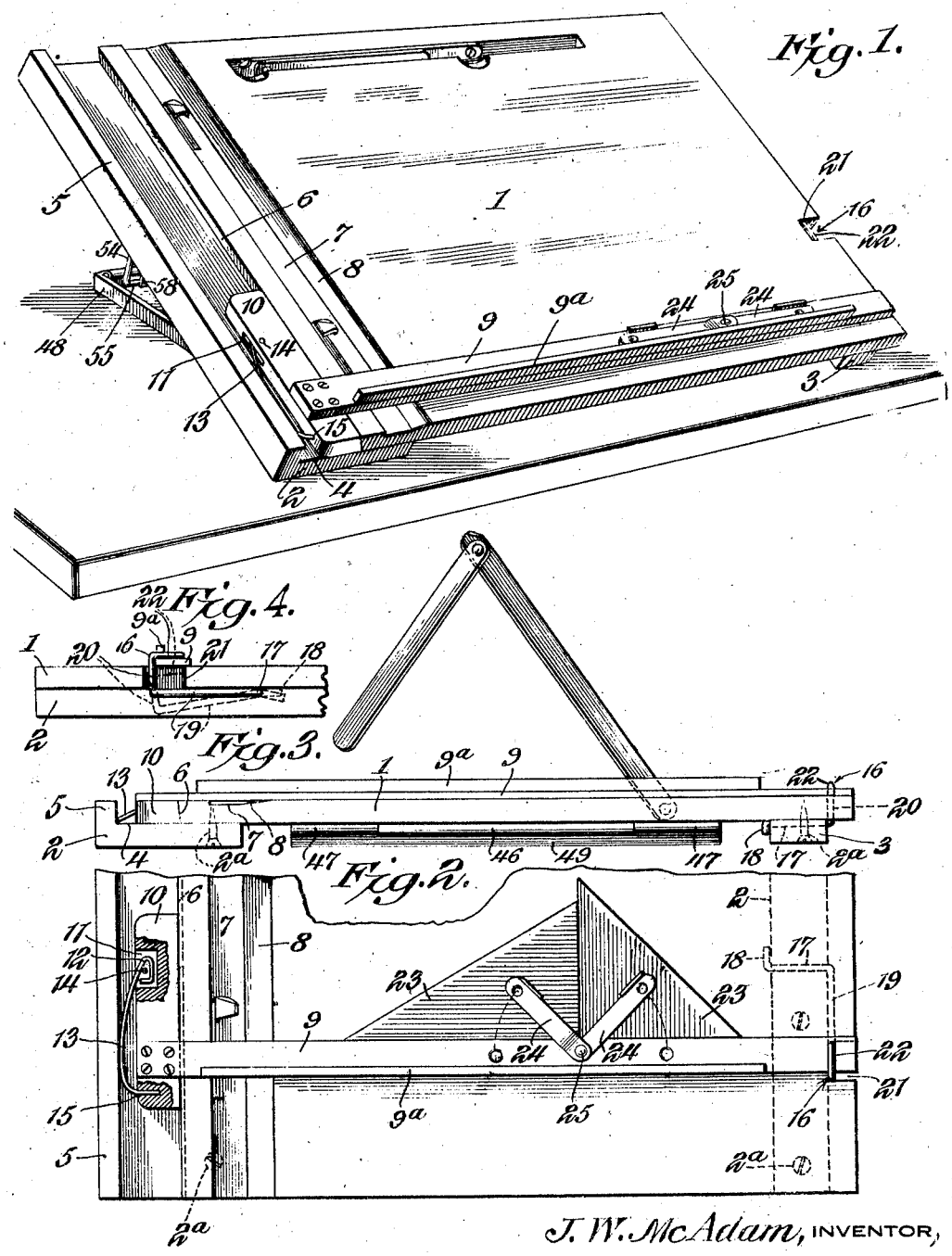
WITNESSES
Howard D. Orr
J. W. McAdam, INVENTOR,
BY E. G. Siggers
ATTORNEY July 2, 1929. J. W. McADAM 1,719,273
DRAWING BOARD
Filed Feb. 9, 1924  2 Sheets-Sheet 2
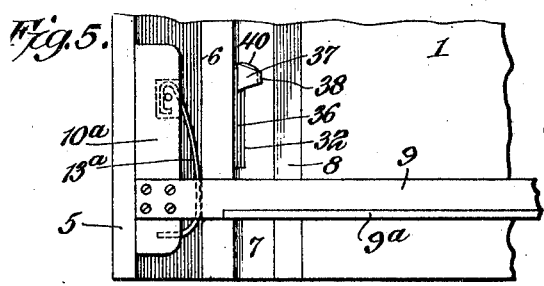
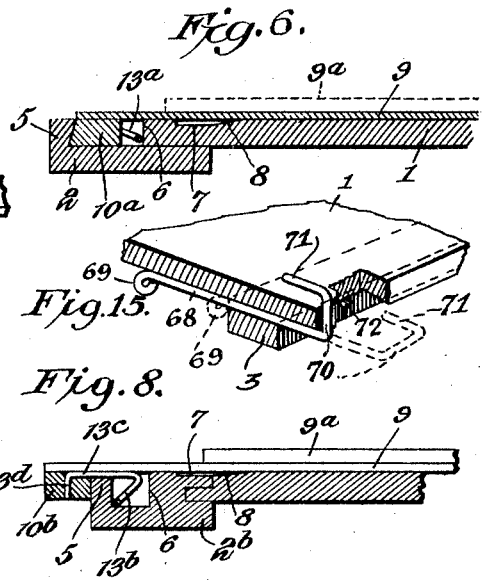
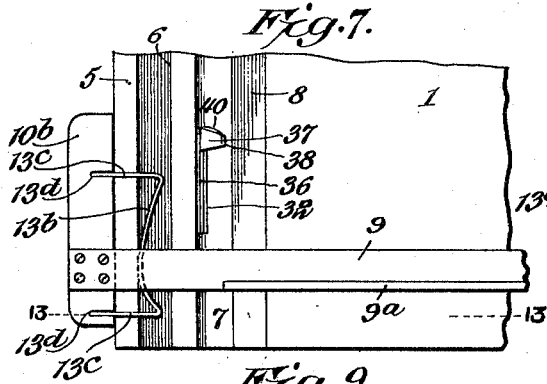
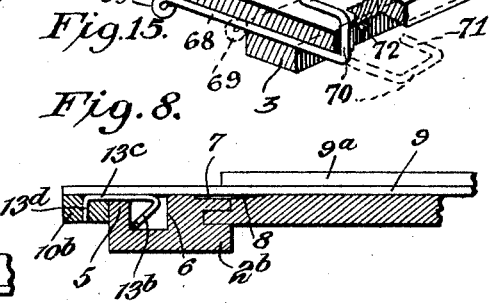
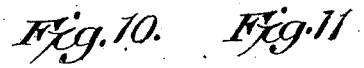
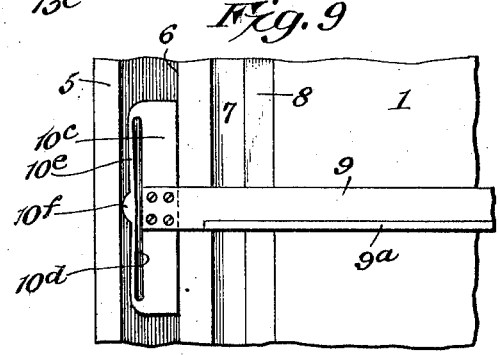
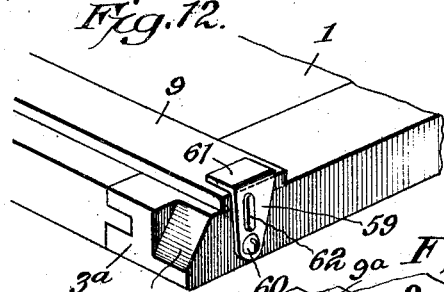
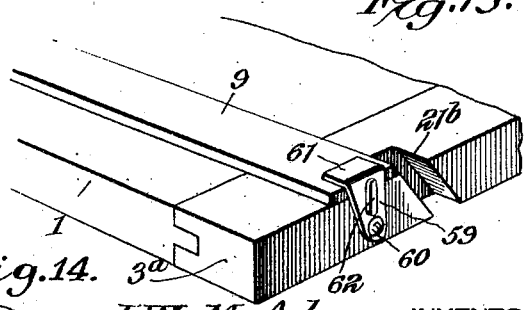
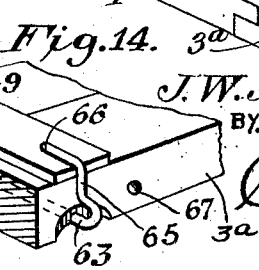
J. W. McAdam, INVENTOR,
BY E. G. Siggers
ATTORNEY
WITNESSES
Howard D. Orr Patented July 2, 1929.

1,719,273

UNITED STATES PATENT OFFICE.

JOSIAH W. McADAM, OF VANCOUVER, BRITISH COLUMBIA, CANADA.

DRAWING BOARD.

Application filed February 9, 1924. Serial No. 691,754.

This invention relates to drawing boards.

The object is to provide a drawing board especially designed for use in schools, manual training institutions and for students generally, whereby the work of the student and the instructor is made easier, although the improvements will be fully appreciated by draughtsmen, who will find them to be of practical use in their regular work.

The combination of elements incorporated in the drawing board, have been designed with a view to production in a simple and compact form so as to make it commercially possible to combine them all in one self-contained, easily handled device, and thus the student or draughtsman may find incorporated in said device a number of necessary features for the preparation of drawings of any kind.

The principal advantage to be found in the use of the board is the elimination of the difficulties generally encountered by the novice or beginner in the manipulation of the various tools and implements necessary in preparing drawings, chief of which is the necessity for constant attention to the T-square to see that it is always in perfect contact with and true to the drawing board, the present board having means for automatically holding the square in proper position regardless of what angle the board may assume.

Another object is to provide means for securing the square to the board at each end thereof, when the device is not in use, and to enable the same to be carried from school to the home, etc., without inconvenience.

A full and complete understanding of the invention may be obtained from a consideration of the following detailed description, taken in connection with the accompanying drawings forming a part of this specification, it being understood that while the drawings show practical forms of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is a perspective view of the improved drawing board in position for use;

Figure 2 is a plan view of the lower portion of the same and illustrating the means for truing and holding the square at both ends and the means for holding the angles to the board when not in use;

Figure 3 is an elevation of the lower end of the board and showing the copy-supporting means in extended position for use;

Figure 4 is a detail side elevation of a portion of the board and illustrating the means for holding the free end of the square thereto when not in use;

Figure 5 is a detail plan view showing a modified form of means for truing the square;

Figure 6 is a sectional view of the same;

Figure 7 is a view, similar to Figure 5, of another modified form of truing means;

Figure 8 is a sectional view through Figure 7 taken on the line 8—8 of Fig. 7;

Figure 9 is a view, similar to Figures 5 and 7, of still another modified form of truing means;

Figures 10 and 11 are detail views of modified forms of springs used in connection with the head of the square;

Figures 12, 13, 14 and 15 are detail perspective views of modified forms of means for holding the free end of the square when not in use.

In the drawings there is illustrated in Figures 1 to 3 inclusive, the preferred embodiments of the various elements comprising the improved drawing board, and in which the numeral 1 indicates the board proper which, in the present instance, is represented as being formed of wood and which, since the board is designed to be used either with or without thumb tacks, may be made of some cheaper grade of wood not necessarily soft, or the same may be made of sheet metal including the usual cleats 2 and 3 respectively. The cleat 2, which is relatively wide, is secured to the left-hand end of the board 1 by countersunk screws 2ª, as shown in Figures 2 and 3, the heads of the screws being located at the bottom side of the cleat, which is also formed with a longitudinal kerf 4 extending throughout its length, to provide, along the outer margin, an upstanding flange or rib 5. The board 1 overlaps the kerf 4 of the cleat 2, substantially halfway, and the end wall 6 of the same is bevelled inwardly and downwardly to provide an undercut, as clearly shown in Figures 1, 2 and 3.

Adjacent to the end wall 6, and spaced therefrom, is a groove 7 cut very slightly into the top surface of the board and arranged parallel to the said end wall 6, the left-hand wall of said groove being perpendicular, while the right-hand wall 8 is bevelled gently back to the surface of the board, and is for the purpose of preventing any abrupt angular bend in the drawing paper when the same is introduced into the groove to be held by thumb tacks or other fasteners in a manner to be later described.

A square having a blade 9 and a head 10 is especially adapted for use in connection with the improved board, the said blade lying flat upon the top surface of the latter and extending longitudinally thereof in the usual manner, and said head 10 being adapted to slide upwardly and downwardly in the groove or channel defined between the flange 5 and the undercut wall 6 of the board proper. The upper surface of the head 10 is flush with the upper surface of the board and said flange, and the width of the head is somewhat less than the width of the said channel, thus providing a space between for a purpose to be explained.

The blade 9 is provided with an upstanding longitudinal strip or flange 9ª secured to the lower edge thereof and extending throughout the major portion of its length, said strip serving to strengthen and stiffen the blade and also serving as a stop or abutment against which to rest pencils or the like.

The head 10 is preferably extended a slight distance below the blade 9, or towards the bottom edge of the board 1, and thus forms, in effect, an L-square instead of the customary T-square in common use, although the latter form of square may be used in connection with the board, the advantage of the L-shape being, however, to permit the blade to be lowered for use at the extreme bottom of the drawing paper without having a projecting end of the head interfere with the body of the operator, as will be readily understood.

The outer or left-hand edge of the head 10 is perpendicular, and is provided substantially halfway between the blade and the free end thereof, with a cavity or recess 11, while the opposite or inner edge of said head is bevelled to fit into the undercut, guiding wall 6 of the board and assist in holding the square to the board.

Projecting into the cavity 11 of the head 10, is the looped end 12 of a wire spring 13, the said loop being smaller than the cavity and thus free to move longitudinally or laterally therein, a pin 14 being passed through the loop and the walls of the cavity to prevent the loop from becoming detached. The other end 15 of the spring 13 is bent parallel with the blade 9, and is anchored in a suitable seat formed in the short end of the head, and it will be noticed that the wire spring is bowed on a curve of such shape that the contact of the same with the perpendicular inner wall of the flange 5 is substantially opposite the center line of the blade, so as to exert an equal strain to maintain the head in contact along its entire length with the undercut wall 6, and to maintain the blade of the square exactly longitudinal of the board or horizontal, even when the square is being used at the extreme top or bottom of said board.

The formation of the head and its coaction with the undercut wall 6, together with the pressure of the spring 13 serves, at all times to prevent the accidental withdrawal of the head end of the square from contact with the board, even when transporting the board from place to place; and in order to hold the free end of the square in position on the board, at such times, there is provided a latch 16 located at the right hand edge of the board and adjacent to the lower edge thereof. The latch 16 is formed of stout wire bent to form a pivotal portion 17 arranged longitudinally of the board and traversing a suitable passageway in the cleat 3, which is spaced somewhat from the right-hand edge of the board. At the inner side of the cleat 3, the wire is bent, as at 18, to prevent the latch from moving out of its pivotal seat, and at the outer side of said cleat the wire is bent parallel thereto, as at 19, and adapted to be rocked upwardly until the same contacts with the underside of the board, and to drop by gravity until the bent inner end 18 contacts with the underside of the board to arrest further downward movement.

The free end of the arm 19 is bent upwardly, as at 20, and projects through a slot 21 formed in the edge of the board and outside of the cleat 3, the terminal portion of the wire being then again bent towards the upper edge of the board to form a finger 22 for engaging over the end portion of the blade 9, as clearly shown in Figure 2 of the drawings. When the blade is thus engaged, it will be seen that the entire length of the square is effectively held to the board for the purposes of transportation, and when it is desired to disengage the latch from the blade, it is only necessary to slide the square upwardly or forwardly to withdraw the end of the blade from beneath the finger 22, when the latch will immediately fall into the slot 21, the latter being somewhat longer than the length of the finger.

In arranging the board for transportation, it is also advantageous to secure the usual triangles 23 necessary in all kinds of mechanical drawing, and for this purpose the blade 9 of the square is provided with a pair of swinging clips 24 mounted at an intermediate point thereon, said clips being formed of strips of flat metal, the inner end of one strip being slightly bent to overlap the adjacent end of the other and being pivoted to the blade by a screw or rivet 25. The outer ends of the clips are provided with finger holds 26, and with depressions 27 formed by pressing in the metal thereof, and the same when in use for holding the angles, are adapted to fit within the usual holes in such angles, and when not in use for this purpose, the said depressed portions 27 are adapted to fit into seats 28 provided in the upper surface of the blade 9.

In Figures 5 and 6, there is illustrated a slightly modified form of square head and tension spring for the same, the said head $10^a$ being adapted to bear against the inner wall of the flange 5 which, in this instance, is undercut, and the coacting edge of the head is bevelled to fit the same, as shown in Figure 6. The spring $13^a$ in this form is attached to the opposite edge of the head in the same manner as the first described form of the device and is deflected as shown and the results are practically the same.

In Figures 7 and 8 there is illustrated another form of the square head $10^b$, the same being adapted to bear against the outer face of the marginal flange 5, while the spring $13^b$ is deflected, as shown in Figure 8 and traverses the lower, outer corner of the channel and is provided with terminal arms $13^c$ extending across the upper surface of said flange 5 and having their ends bent downwardly and seated in suitable openings in the square head, as indicated at $13^d$. By deflecting the springs as shown in Figures 6 and 8, the tendency is increased to hold the blade of the square against the board. In Figures 7 and 8 there is also shown a modified form of cleat $2^b$.

Figure 9 discloses another form of spring for holding the head of the square in position to the board and herein the said head $10^c$, which may be either formed of suitable wood or metal, and which traverses the channel, is provided with a longitudinal slot $10^d$ located adjacent to its outer edge, and terminating short of the ends thereof, thus resulting in a resilient strip $10^e$ acting as a spring and having a central boss or extension $10^f$ directly opposite the center line of the blade, for bearing against the opposite wall of the channel and serving to true and to hold the square in position.

Figures 10 and 11 disclose modified forms of springs which may be employed to hold the head of the square properly, that of Figure 10 having an intermediate loop $13^e$ at the point in line with the center line of the blade, while the form of Figure 11 is provided with a pair of spaced indentations $13^f$ at each side of such point, these features serving to lend resiliency to the springs.

In Figure 12 there is shown a modified form of the holding means for the free end of the square blade, and in this form the right hand cleat $3^a$ is slightly different from the first-described form and is secured to the edge of the board in a well known manner. At the lowermost corner an inclined recess $21^a$ is formed, and adjacent to the same there is pivoted a latch 59 formed of suitable metal and fitting against the outer face of the cleat $3^a$ to which it is pivoted by a screw 60. The latch is provided with an inwardly extending arm 61 adapted to engage over the end of the blade 9 when the said latch is raised, a finger hold 62 being provided to facilitate such action. When the blade is freed, the latch may fall into the recess $21^a$ entirely out of the way of the movements of the square.

Figure 13 shows another manner of housing the latch when not in use to hold the free end of the square blade. The slot $21^b$, which is preferably inclined and is located the desired distance from the lower end of the cleat $3^a$ is adapted to receive the arm 61 of the latch when the same is swung on its pivot.

Another form of blade holder is shown in Figure 14, in which a suitable passageway is provided transversely through the lower portion of the cleat $3^a$, for the rotating and sliding movement of a rod 63, which has its inner end bent downwardly, as at 64, to prevent the same from being withdrawn from its seat. The outer end of the rod is bent at right angles at 65 to normally extend upwardly, and terminates in an inturned finger 66 for engaging over the free end of the blade 9. By sliding the device longitudinally of its bearing, the finger 66 may be freed from the blade and then rocked about its axis to aline the said finger with an aperture 67 for holding the device out of the way.

Figure 15 likewise discloses a similarly formed latch 68 mounted for sliding and rotary movement, as in the first form of cleat 3, said latch having at its inner end a stop 69 to prevent its dislodgment and having an upturned arm 70 at its outer end terminating in a finger 71 for engaging the blade, and which, when turned downwardly ninety degrees, as indicated in dotted lines, is adapted to be seated in the aperture 72 and to be entirely concealed beneath the edge of the board.

Any means may be employed for supporting the board in the usual inclined position desired by a draftsman, the device shown in the drawings and indicated by the reference numerals 46, 47, 48, 49, 54, 55 and 58 being indicative of that shown in the co-pending application for patent filed Feb. 28, 1925, Serial No. 12,292 on a combined tray and drawing board support.

From the foregoing it is thought that the construction, operation, and many advantages of the invention will be apparent.

What is claimed is:—

1. A drawing board having a groove extending transversely thereof at the left-hand end and having an undercut wall, an elongated square blade mounted on the board and having a head seated in the groove and co-acting with the undercut wall, and means for holding both ends of the blade to the board, when not in use.

2. A drawing board having a groove extending transversely thereof near the left-hand end, said groove having its inner wall undercut, a square having an elongated blade extending longitudinally of the board and a head seated in the groove and provided with a bevelled inner edge fitting the undercut wall, means carried by the head for maintaining the blade true, said means serving also to hold the head to the board at all times, and means mounted at the right-hand side of the board for temporarily engaging the free end of the blade when not in use.

3. A drawing board having a groove extending transversely and at one end thereof, said groove having its inner wall undercut and its outer wall vertical, a square having an elongated blade, a transverse head at one end of the blade and adapted to move up and down in the groove, and a bowed spring secured to the head at its opposite ends and having its bowed intermediate portion extending from the head and contacting with the outer wall of the groove, the inner edge of the head being formed to fit the undercut wall of the groove.

4. A drawing board having a groove extending transversely and at one end thereof, said groove having a vertical outer wall and an undercut inner wall, a square having an elongated blade adapted to rest on the board, and a transverse head seated in the groove and engaging the undercut side walls thereof, a spring mounted in the head and having an exposed portion bearing against the vertical side wall to maintain the blade true on the board and to hold the head end of the square to the board.

5. A drawing board having a groove extending transversely and at one end thereof, said groove having its inner wall undercut, a square adapted to cooperate with the board and having a head seated in said groove, the inner edge of the head being inclined to fit the undercut, said head being of less width than the groove and having a kerf in its opposite edge, a bowed spring having one end movably mounted in said kerf, the other end being rigidly secured to the head, said spring being adapted to bear at its intermediate portion against the opposite wall of the groove to hold the square true on the board.

6. A drawing board having a groove extending transversely and at one end thereof, said groove having one wall undercut, a square adapted to cooperate with the board and having a head seated in said groove, one edge of the head being inclined to fit the undercut, said head being of less width than the groove and having a kerf in its outer edge, a bowed spring having one end movably mounted in said kerf, the other end being rigidly secured to the head, said spring being adapted to bear at its intermediate portion against the opposite wall of the groove to hold the square true on the board, the contact point of the bowed spring being directly in line with the center of the blade.

7. A drawing board having a groove extending transversely and at one end thereof, a square provided with an elongated blade, a transverse head at one end of the blade said head having a long and a short end, and a spring carried by the head and provided with an intermediate contacting portion engaging with the groove in alinement with the longitudinal center of the blade, the spring having a rigid connection to the short end of the head and a loose connection to the long end thereof.

8. A drawing board having a groove extending transversely thereof, a square having a head and a blade, means carried by the head and coacting with one wall of the groove to maintain the square true, the free end of the blade terminating at the opposite edge of the board, and a latch carried by the latter for temporarily engaging the same to hold the free end of the blade to the board when not in use.

9. A drawing board having a groove extending transversely thereof, a square having a head and a blade, means carried by the head and coacting with one wall of the groove to maintain the square true, the free end of the blade terminating at the opposite edge of the board, said board having a notch, a latch pivoted to the board and having a finger arranged transversely of the blade and adapted to engage over the blade when moved vertically through said notch to temporarily hold the free end of the blade to the board when not in use.

10. A drawing board having a groove extending transversely thereof, a square having a head and a blade, means carried by the head and coacting with one wall of the groove to maintain the square true, the free end of the blade terminating at the opposite edge of the board, said board having a notch, a latch pivoted to the board and having a finger arranged transversely of the blade, said finger normally lying below the surface of the board through gravity and adapted to engage over the blade when moved vertically through said notch to hold the free end of the blade to the board when not in use.

11. A drawing board having a groove extending transversely and at one end thereof, a square having a head at one end and a blade, resilient means carried by the head for engaging one wall of the groove, and a latch pivoted to the board and having an overhanging finger for temporarily engaging the free end of the blade, when not in use.

12. A drawing board having a groove extending transversely and at one end thereof, a square having a blade and a fixed head at one end of the blade, resilient means carried by the head for engaging one wall of the groove, and a latch pivoted to the other end of the board and having an overhanging finger to temporarily engage the free end of the blade when not in use, said board having a notch to receive the finger when the latter is not in use.

13. A drawing board having a groove extending transversely and at one end thereof, a square having a blade and a head at one end of the blade, resilient means carried by the head for engaging one wall of the groove, and a movable latch mounted on the board and having an overhanging finger to temporarily engage the end of the blade.

14. In combination with a drawing board, a square having a blade, swingable spring clips mounted on the blade thereof and adapted to bear against triangles or the like when swung outwardly to hold the latter in place when the board is not in use.

15. In combination with a drawing board, a square having a blade provided with recesses, and a plurality of swingable spring clips mounted on the blade of the square and adapted to bear against triangles or the like when swung outwardly to hold the triangles against the board and in contact with the edge of the blade when the board is not in use, said clips having catches to engage the holes in the triangles or to engage the said recesses in the blade when swung into inactive position.

16. The combination with a drawing board of a square having a pair of elongated clips with their inner ends overlapped and pivoted to the blade of the square, the outer ends of the clips having finger holds and depressed portions, and the said blade also having depressions to receive the depressed portions on the clips so as to hold the clips longitudinally of the blade when not in use.

In testimony, that I claim the foregoing as my own, I have hereto affixed my signature.

JOSIAH W. McADAM.